United States Patent [19]

Zeliff et al.

[11] Patent Number: 4,721,476
[45] Date of Patent: Jan. 26, 1988

[54] ELECTRICAL CONNECTION BOX USED IN CONJUNCTION WITH RAISED FLOORS

[75] Inventors: Richard B. Zeliff, Ramsey; Gerson Feiner, So. Woodcliff Lake, both of N.J.

[73] Assignee: Interchangeable Hatches Inc., Cliffside Park, N.J.

[21] Appl. No.: 812,646

[22] Filed: Dec. 23, 1985

[51] Int. Cl.[4] ............................................. H01R 13/44
[52] U.S. Cl. .................................. 439/142; 439/536; 439/925; 439/571; 174/48
[58] Field of Search .............. 339/44 R, 44 M, 122 R, 339/123, 125 R; 174/48, 66

[56] References Cited

U.S. PATENT DOCUMENTS

| | | | |
|---|---|---|---|
| 792,425 | 6/1905 | Kliegl et al. | 339/44 R |
| 4,297,524 | 10/1981 | Fork | 174/48 |
| 4,324,078 | 4/1982 | Gray | 174/48 |

*Primary Examiner*—Gil Weidenfeld
*Assistant Examiner*—Paula A. Austin
*Attorney, Agent, or Firm*—Morgan & Finnegan

[57] ABSTRACT

An electrical connector box adapted to be used in connection with the raised floor concept with a raised floor positioned above the main floor. A plurality of substantially rectangular openings are formed in the raised floor. A frame is positioned in the openings. The electrical connector box is lowered into engagement with the frame and into the space between the raised floor and the main floor. The electrical connector unit includes flange means which is adapted to rest adjacent the raised floor to suspend the electrical connector unit between the floors. The unit further includes flange means engaging the under-surface of the raised floor to maintain the unit in position. A sling or saddle-like structure extends downwardly from the electrical connector box into the space between the raised floor and is adapted to receive wires, cables and the like. There is a hinged top plate movable to a first position providing access to the interior of the electrical connector box and a second closed position. Finger-like openings in the top plate provide access to the electrical connector box when the top plate is in the closed position so that wires, etc. can be connected to various types of electrical equipment.

11 Claims, 16 Drawing Figures

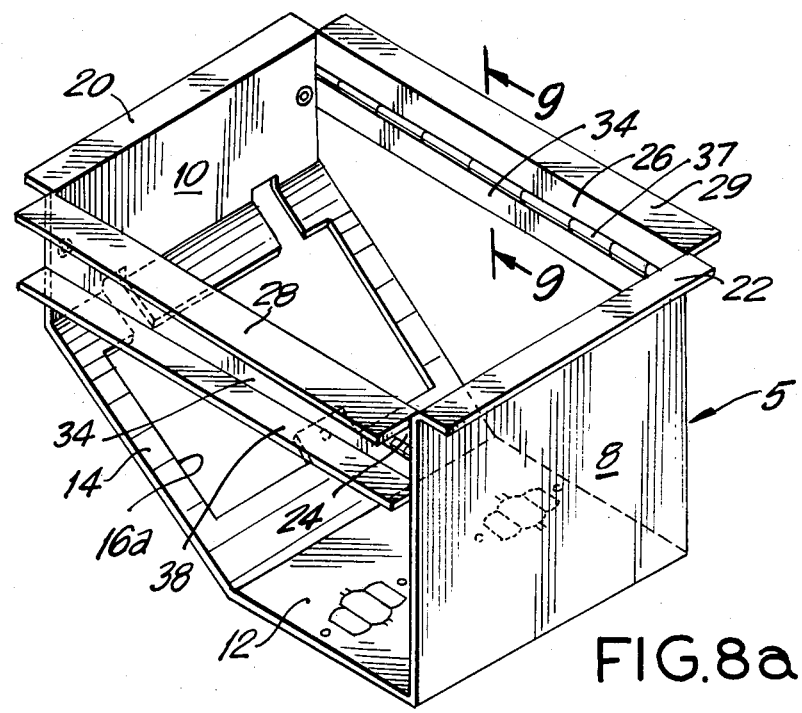
FIG.8a
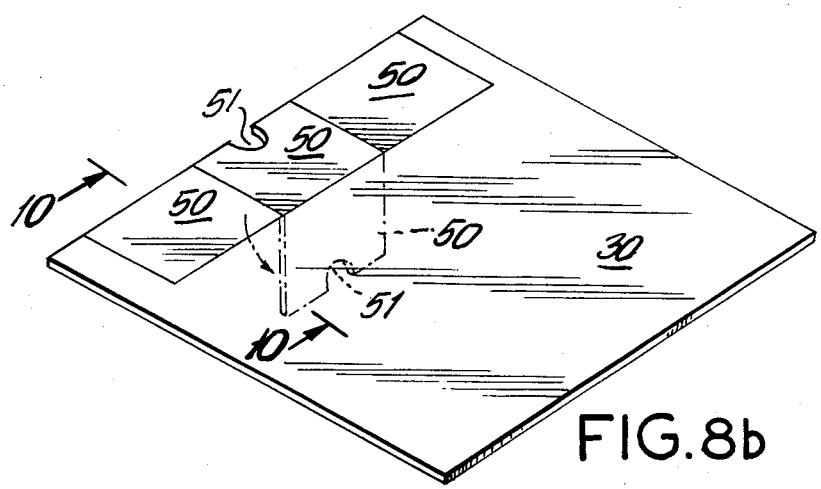
FIG.8b
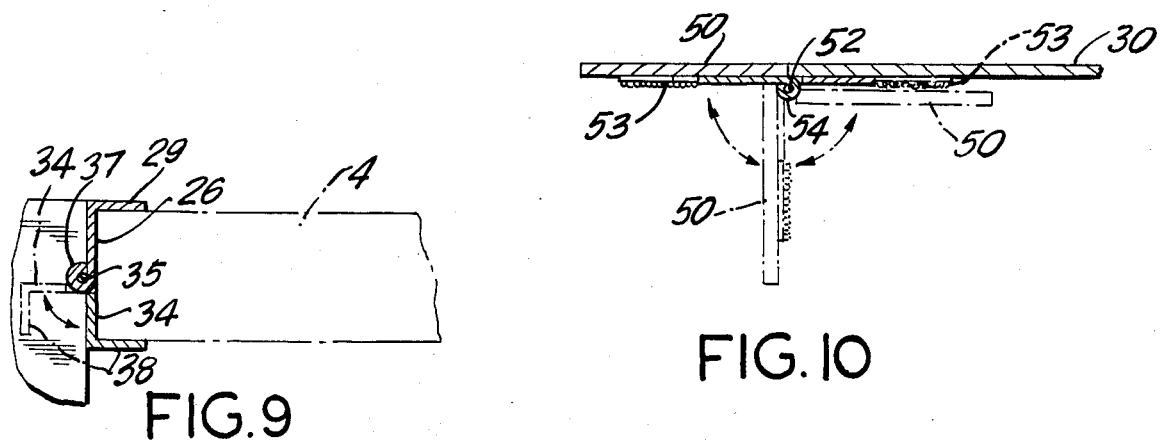
FIG.9
FIG.10

ELECTRICAL CONNECTION BOX USED IN CONJUNCTION WITH RAISED FLOORS

BACKGROUND OF THE INVENTION

This invention relates to an electrical connector unit for making electrical connections. More particularly, this invention relates to an electrical outlet unit which is particularly adapted for use in connection with raised floors.

In recent years typical business offices have witnessed a tremendous increase in the amount and variety of electrical equipment used in a modern office. In days past an office worker could function quite effectively with a telephone, desk, chair and electrical typewriter. In today's modern office a typical office worker may have access to a computer terminal, calculator, a screen (CRT unit), a word processing unit, power lights, an intercom unit, a facsimile transmitter-receiver, a desk copier as well as other types of modern electrical office equipment.

Each of these pieces of electrical equpment requires an electrical connection of a wire or cable of some sort. As a result a tremendous amount of wire and cable is needed in a modern office In some instances, with a relatively large amount of square footage, there may be literally miles of wire and cable. Obviously, with such a vast amount of wiring, cables, conduits and pipes, etc. ways and means must be found to locate or house these materials in a safe, efficient and sightly manner.

One development that has come into widespread use is the concept of access or raised floors. An access or raised floor is a floor which is positioned above the main floor generally in the amount of between about six (6") to thirty (30") inches, depending on the amount of electrical equipment involved.

The raised or access floor concept has numerous advantages over other options. The cost is comparable to the use of duct systems and cellular decks which have considerably less flexibility.

The raised floor concept is particularly adapted to modern day open offices and provides excellent flexibility of service distribution without unsightly power cables, power poles or visible outlet boxes. When it is necessary to renovate or make other changes it is a relatively simple matter to remove the floor panels, make the necessary wiring and cable changes and then replace the floor panels. There are a variety of different ways and means for raising the floor above the main floor including the use of pedestals.

This invention relates to an electrical connection box or unit used in connection with the raised floor concept. In order for all of the advantages of the raised floor concept to be achieved it is necessary that there be an electrical junction box or unit to which can be connected the incoming and outgoing wires, cables, etc. necessary for the operation of typewriters, computers, terminals, screens, copying machines, and the myriad of other equipment used in the modern office. An electrical junction box used in conjunction with the raised floor must have several attributes if it is to be successful. First, it must be strong and sturdy since it must be capable of withstanding the load placed on such floors. In addition, it must be sufficiently flexible so as to permit a variety of electrical hook-ups or connections. It must also be adapted to be used with a variety of different types of raised floor constructions. In addition, the electrical junction connector unit must be accessible form the top of the raised floor so that the necessary electrical connections can be made quickly and expeditiously. Further, the unit should be readily removable for repairs and renovation but at the same time must be capable of being maintained securely in place.

There are several different types of electrical junction boxes presently being used in conjunction with the raised floor concept. There are certain electrical junction type boxes currently in use which are made of plastic. These boxes have whatever advantages flow form the use of plastic, but have the disadvantage of lack of strength to withstand the floor loads encountered in certain situations. Other prior art electrical junction type boxes are fixed in place by welding or the like and have the disadvantage that they are inflexibly positioned and cannot be readily removed. This is a distinct disadvantage in that it substantially reduces flexibility, makes repairs difficult and requires substantial renovation in the event that minor or major changes to the office layout are require. Further, where welding is required this is an additional construction step and one which requires additional structural support.

OBJECTS OF THE INVENTION

With the foregoing in lmind it is an object of this invention to provide a new and improved electrical connection unit particularly adapted for use in connection with raised floors.

Another object of this invention is to provide a new and improved electrical connection box which is particularly adaptable for positioning in the space between the regular floor and the raised floor.

Another object of this invention is to provide a new and improved electrical connection unit adapted for use with raised floors of any construction.

A further object of this invention is to provide a new and improved electrical connection box adaptable for use with raised floors which can be lowered into its desired operating position.

Another object of this invention is to provide a new and improved electrical connection box adapted for use with raised floors which can be lowered into place and removably maintained in operating position without the use of tools or fastening devices such as screws, fasteners, etc.

A still further object of this invention is to provide a new and improved electrical box adapted for use in connection with raised floors which can be serviced without removing the raised floor or any portion thereof.

Another object of this invention is to provide a new and improved electrical connector unit for use with a raised floor construciton which can be removably locked in position with respect to the raised floor without the use of screws, fasteners, etc.

Another object of this invention is to provide a new and improved electrical connection box which can be removably locked in place.

Sitll another object of this invention is to provide a new and improved electrical connection box adapted for use with raised floors which can be removably locked in place by pivotal flanges.

Another object of this invention is to provide a new and improved electrical connection box adapted for use with a raised floor which is constructed and arranged to withstand the rolling floor load involved.

A further object of this invnetion is to provide a new and improved electrical connection box adapted for use with raised floors which is constructed and arranged to be used in a variety of electrical conditions.

Another object of this invention is to provide a new and improved electrical connection box which is compatible with a wide variety of raised floor constructions.

Still another object of this invention is to provide a new and improved electrical connection box for use with raised floors which can be positioned so that the top surface of the electrical connector box will be located below the top surface of the raised floor.

A still further object of this invention is to provide a new and improved electrical connector unit having means for permitting access to the interior of the unit even when in the closed position.

Additional objects and advantages of this invention will be set forth in the description which follows and, in part, will be obvious from the description, the objects and advantages being relized and obtained by means of the parts, elements, methods, apparatus and procedures particularly pointed out in the appended claims.

BRIEF DESCRIPTION OF THE INVENTION

Briefly described, the present invention comprises an electrical connection box adapted for connecting input and output wires and cables from a source of power to electrical equipment commmonly used in an office. The invention is particularly adapted for use in the space between the regular floor and a raised floor. The invention includes a substantially rectangular frame from which depends a sling or saddle-like structure adapted to position a variety of electrical connections within the unit.

The electrical connector unit of the invention is adapted to be positioned within substantially square openings in the raised floor. Optionally, a substantially square frame can be positioned with the opening and welded to the floor structure. The main portion of the electrical connector unit is smaller in length and width dimensions than the substantially square openings in the raised floor. However, the electrical connector unit includes outwardly extending flanges adapted to engage the raised floor surface adjacent the openings. In this way the unit can be lowered or dropped into the space between the regular floor and the raised floor. The invention includes flange means, which may be movably adapted to engage the undersurface of the raised floor to removably maintain the unit in the desired operating position. The initial positioning of the unit and the locking of the unit is accomplished without tools, screws or other fasteners. Where the optional frame is used, the electrical connector unit will rest on a flange connected to the frame.

In order to provide access to the interior of the unit, it is provided with a hinged top surface. The hinge permits the top surface to be pivoted to an out-of-the-way position so that adjustments and wiring connections can be made.

In the closed position the top surface has sufficient strength to withstand the floor loads involved. The top surface further includes movable, preferably pivoted, fingers which provide access to the interior of the unit for wires, cables or the like from various types of electrical equipment. The unit can be arranged with respect to the raised floor so that the top surface is flush with the top surface of the raised floor.

The electrical connector unit can be made of any suitable material having sufficient strength, but is preferably made of steel.

The invention consists of the novel parts, steps, construcitons and improvements shown and described herein.

The accompanying drawings, which are incorporated in and constitute a part of this specification, illustrate an embodiment of the invention and, together with the description, serve to explain the principles of the invention.

BRIEF DESCRIPTION OF THE DRAWINGS

FIG. 8a is a perspective view of the electrical connector unit box alone.

FIG. 8b is a perspective view of the top cover plate alone.

FIG. 9 is a section of hinge taken along line 9—9 of FIG. 8a to show the hinge.

FIG. 10 is a partial sectional view.

DETAILED DESCRIPTION OF THE INVENTION

The invention will now be described with reference to the drawings. Referrring to FIGS. 1-3, there is shown the main floor 2 and the raised floor 4 which provides an access space and a cooling zone for the electrical equipment serviced by the electrical connector described herein. Typically, the distance between the main floor will be between six (6") and thirty (30") inches.

The distance between the main floor 2 and the raised floor 4 depends on the amount of electrical equipment to be serviced. In some instances rather sophisticated electrical equipment may be involved including typewriters, calculators, power lights, computers, terminals and screens. It is essential that there be sufficient access to accommodate the connector boxes and the wires and cables associated therewith and sufficient space for the electrician's arms and hands.

Figure 1:
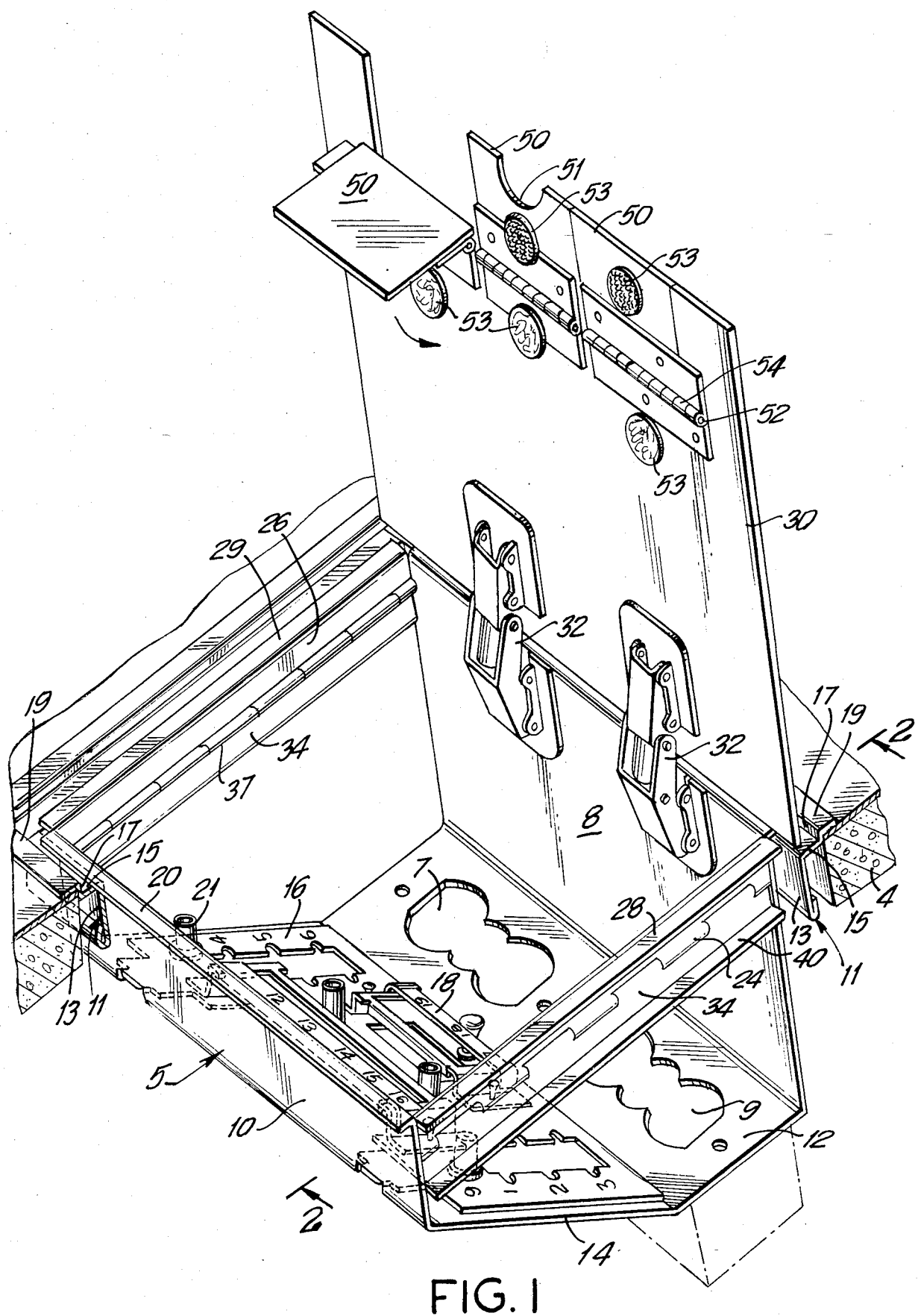
FIG. 1 is a perspective view of the invention.
Figure 2:
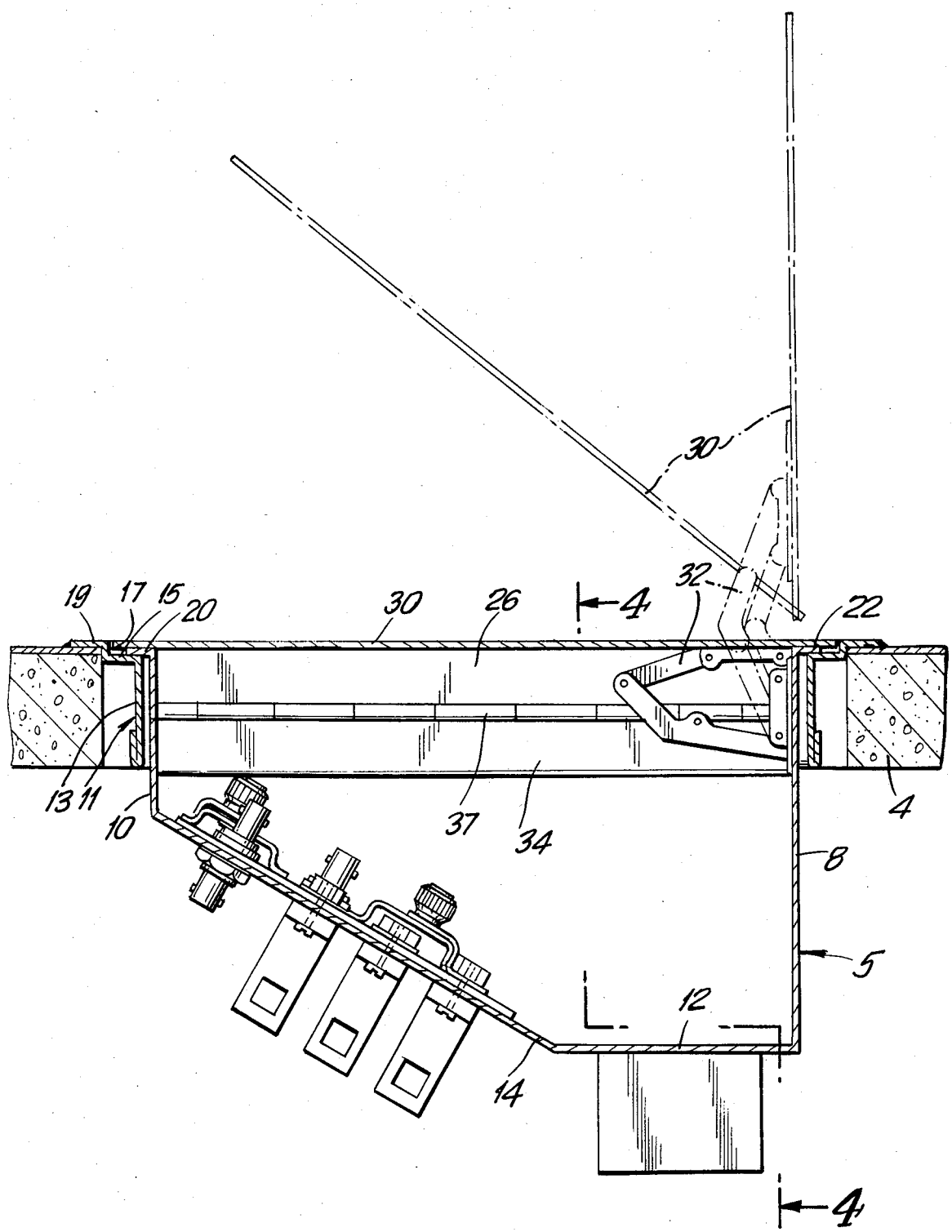
FIG. 2 is a side elevation view in cross section taken along line 2—2 of FIG. 1 with the top plate cover in the down position.
Figure 3:
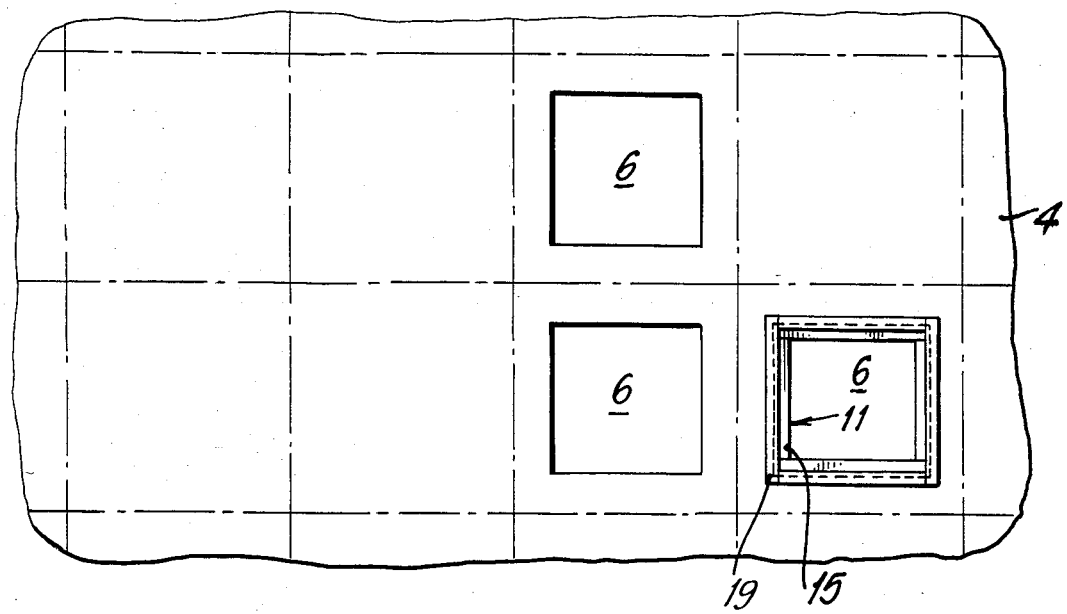
FIG. 3 is a top plan view of the raised floor showing cut-out openings.
Figure 4:
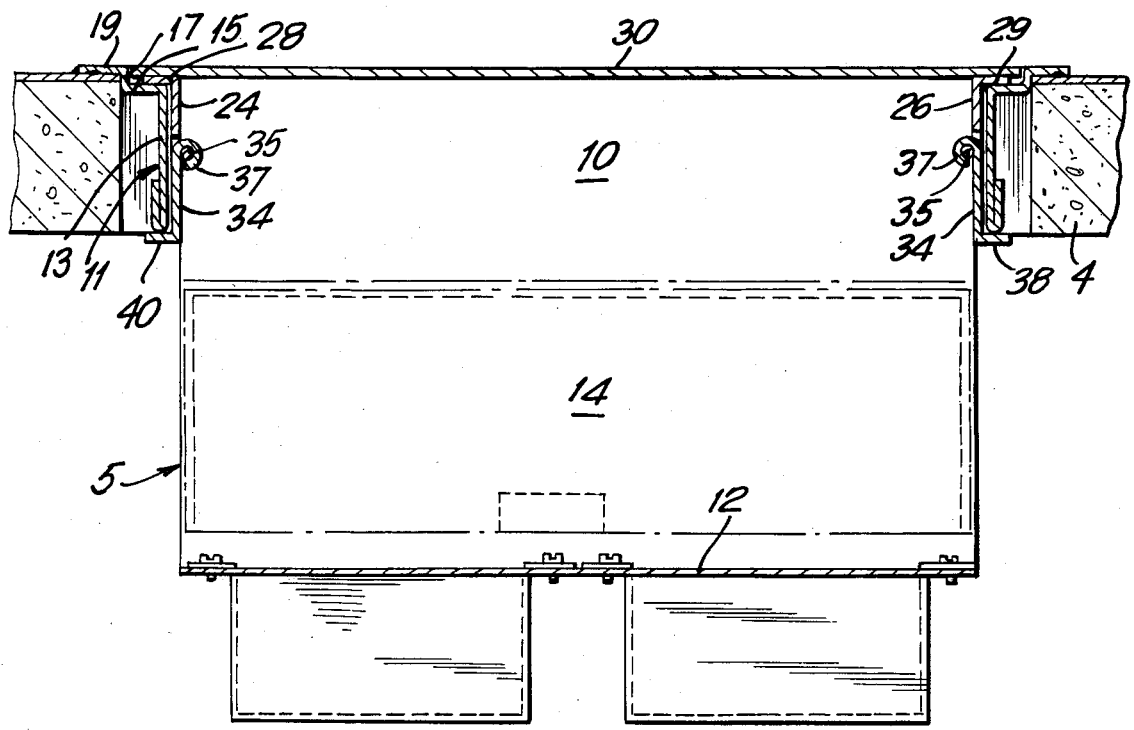
FIG. 4 is a cross sectional view taken along line 4—4 of FIG. 2 with certain parts removed for clarity.
Figure 7:
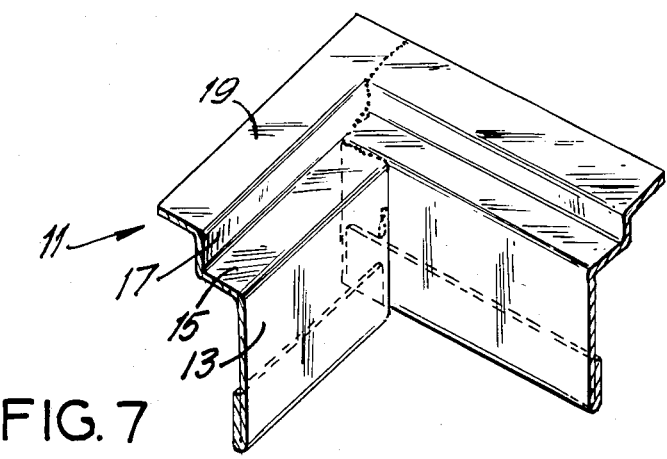
FIG. 7 is a partial perspective view showing the optional frame used to support the electrical connector unit.

As shown in FIGS. 1-3, the raised floor is provided with a suitable number of rectuangular and preferably square openings 6 which extend through the raised floor 4. The number of openings can vary depending on the number required to service the electrical equipment involved. In the event of changes in the office's electrical requirements, a greater number of such openings can be provided without requiring a major renovation. Optionally, a frame 11 can be positioned with the opening 6. The frame 11 can be attached to the floor in any convenient manner such as welding. The frame 11 includes the vertical portion 13 and a stepped construction comprising horizontal portion 15, vertical portion 17, and horizontal flange 19. (FIGS. 4 and 7).

In accordance with this invention means is provided for permitting a larger number of electrical connections in the space between the main and covered floors. As embodied, this means includes an electrical connector unit having a frame 5 which is rectangular and preferably square in shape. The frame can have any convenient dimension and nine (9") inches has been found to be useful in certain instances. Extending downwardly from frame 5 is an essentially sling or saddle-shaped member comprising a vertical first or front wall 8 and a vertical second or back wall 10. Extending inwardly (FIG. 1) and horizontally from the back wall 10 is a bottom wall 12. Inclined between bottom wall 12 and the wall 10 and an inclined bottom wall 14. As can be seen in FIGS. 1 and 4, the resultant structure is basically sling or saddle-shaped with the sides being substantially unobstructed (See FIG. 1).

By virtue of the substantially sling or saddle-shape, the sides of the electrical connector unit and the portion below the bottom wall 12 are substantially unobstructed which has a substantial advantage during installation and repair in that space is provided for making the necessary wires and cables and for the electrician's hands and tools.

In accordance with this invention means is provided for suspending the electrical connector unit below the raised floor in a manner which permits the connector box to be initially installed simply and expeditiously and to be easily removed in the event that re-wiring or repair is necessary without the use of tools, screws or other fasteners. The top surface of the electrical connector unit will be substantially flush with the raised floor.

As embodied, this means comprises ledge or flange means extending horizontally from the electrical connector unit and adapted to rest on the upper surface of the raised floor. Referring to the drawings, there is shown a horizontal flange 20 extending from the wall 10 and a horizontal flange 22 extending from the wall 8. Where the optional frame is used these flanges reset on the horizontal flange of the frame member 11. In addition, extending between the walls 8 and 10 are vertical flanges 24, 26. Extending outwardly at right angles from the vertical flanges 24, 26 are horizontal flanges 28, 29, respectively.

In accordance with this invention means is provided for alternatively providing access to or protecting the interior of the electrical connector unit by serving as a floor. As embodied, this means includes a top plate 30 which is movably connected to the wall 10 of the electrical connector box in any convenient manner such as the hinge structure 32. The particulars of the hinge structure 32, illustrated in FIGS. 1 and 3, form no part per se of the present invention and any hinge structure capable of permitting hinged movement from the full line position of FIG. 1 to the dot-dash positions of FIG. 2 will be satisfactory.

In FIG. 2 the top plate 30 is shown in full lines in the closed position. When in this closed position, the interior of the electrical connector box is protected against dust and other contamination and the top plate becomes part of the floor.

In FIG. 1 the hinged top plate 30 is shown in the open position. When in this position the electrician is provided with access to the interior of the electrical connector unit so that wires and cables can be electrically connected. When in this open position the top and sides of the electrical connector unit are open to provide accessibility. While, as illustrated, the top plate 30 is shown hinged to the wall 8, it could be hinged to wall 10 if desired.

The entire electrical connector box can be made of any convenient material but is preferably made of steel.

In any event, the weight of the hinged top plate 30 is sufficient that it will not be accidentally raised when in the closed position. For example, the weight of the hinged top plate is sufficient so that it will not be raised when vacuuming the floor. In addition, the hinged top plate is sufficiently strong to withstand the floor loads including rolling loads normally encountered in an office situation.

In addition to the aforesaid functions, the hinged top plate also can be conveniently used as a handle for transporting the unit and for lowering the electrical connector unit through the opening 6 in the raised floor 4.

In accordance with this invention means is provided for locking the electrical connector unit in place against undesired vertical displacement.

As embodied, this means includes a movable flange member movably connected to the vertical flanges 24, 26. Referring to FIG. 3 and FIG. 9, the flange member has essentially an L shape. One leg 34 of the L is hinged by a rod 35 which extends through the bushings 37 (See FIG. 4) to the vertical flanges 24, 26. The other legs 38, 40 of the L are adapted to fit under the thickness of the raised floor 4 to maintain the electrical connector unit in position. The flanges 38, 40 can be pivoted out of the way (See dot-dash in FIG. 9) towards the exterior of the unit when it is being lowered into position and are then moved outwardly to a position of engagement with the undersurface of the raised floor 4 (See full line position FIG. 9). When in this position, the electrical connector unit is locked into position against vertical displacement.

Figure 14:
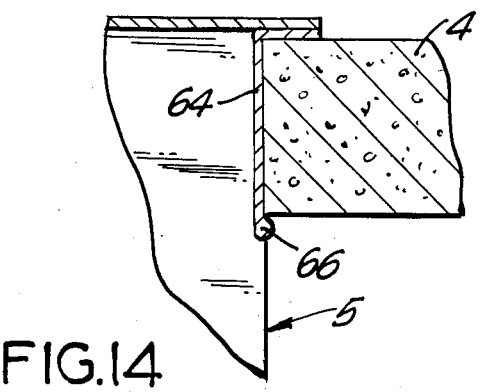
FIG. 14 is a partial sectional view showing another embodiment of the invention showing an alternative for locking the electrical connector unit in place.

Another embodiment of the locking means is shown in FIG. 14 of the drawings. In this alternative embodiment, the L shaped hinge flange is dispensed with and in its stead a flexible vertical member 64, having an abutment 66 at its terminal end, is used. When the electrical connector unit is lowered into the opening 6, the abutment 66 snaps into a position of engagement with the undersurface of the raised floor 4 to prevent accidental vertical displacement of the electrical connector unit. It will be noted that in each embodiment locking is accomplished without screws or other fasteners.

In accordance with this invention means is provided for providing access to the interior of the electrical connector unit even when the hinged top plate is in the closed position. As embodied (See FIG. 8b and FIG. 10), this means includes a plurality of fingers 50; three (3) in number as shown in FIG. 7b.

In each case a rod 52 is provided which fits through circular bushings 54. The fingers 50 which when in closed position rest on the front flange can be pivoted inwardly (dot-dash position) into the electrical connector so as to provide access to the connector terminals. This arrangement is particularly useful so that cables and wires can extend outwardly from the interior of the connector to various types of electrical equipment. Adhesive portion 53, such as velcro, will maintain the fingers in position.

In FIG. 8b there is illustrated another feature of the pivoted finger, a semicircular opening 51 in the terminal end of one of the fingers which provided access to the interior of the electrical connector even when the top plate is in the closed position. In particular, the opening 51 permits a user to move top plate 30 to an open position.

Figure 5:
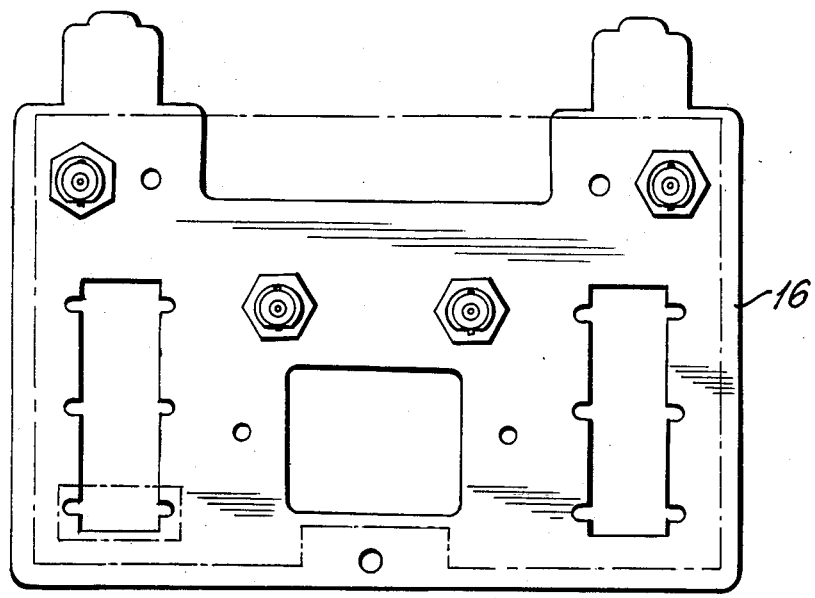
FIGS. 5 and 6 are front and rear views, respectively, showing the electrical connector plates.
Figure 6:
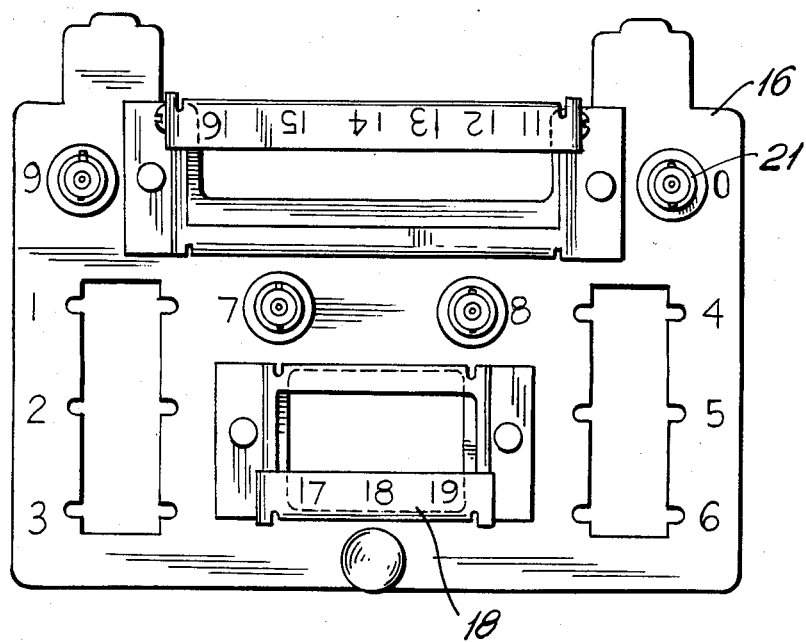

FIGS. 5 and 6 show for illustrative purpose the type of electrical connector terminal that may be used within the electrical connector box. It will be appreciated that outlet openings 7, 9 in bottom wall 8 are provided so that power at 110 or 220 volts can be supplied to the interior of the electrical connector unit. It will be understood that other and different electrical connectors can be used depending on the electrical requirements involved. Referring to FIGS. 5 and 6, there is shown the following:

In accordance with this invention, an electrical connector plate 16 is illustrated in FIGS. 5 and 6. The electrical connector plate is removably attached to wall 14 of the sling member in cooperative relationship with the opening 15 in the wall 14 (See FIG. 8a). Preferably, the electrical connector plate 16 is attached to the wall 14 by a connector 21 by a nylon hand-operated fastener. One suitable fastener is known by the trademark "Nylatch". In this form of fastener a shaft member expands a hollow plastic fastener element which has been placed in an operative position in plate 16. Details of such a fastener are not pertinent to this invention and other different types of fasteners can be used.

The electrical plate 16 is adapted to provide a wide variety of terminals including co-axial terminal 19. The plate can also provide terminal connections for data communication, fiber optics connections, modems, CRT, etc. Conveniently, as can be seen, the various terminals can be numbered.

Other and different types and forms of electrical connector plates may be used, if desired.

Figure 11A:
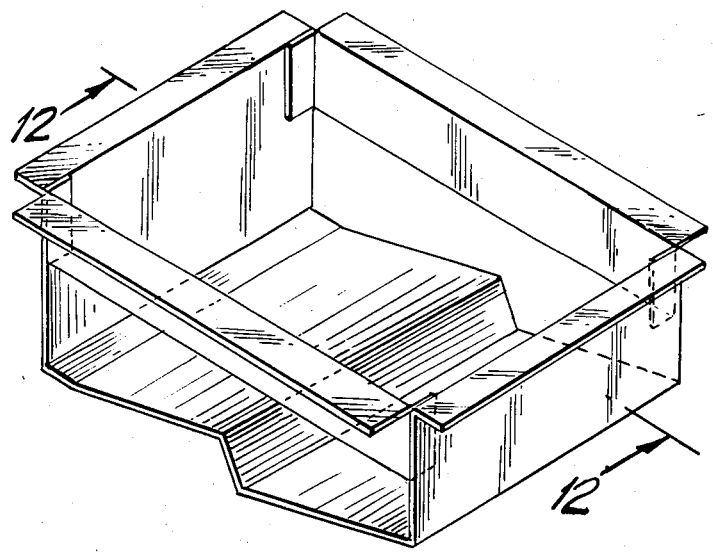
FIG. 11a is a perspective view of an alternate embodiment of the invention.
Figure 11B:
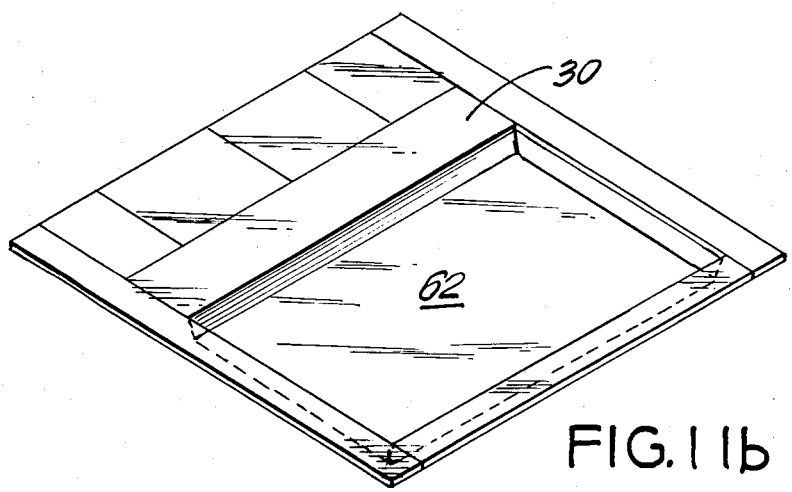
FIG. 11b is a perspective view of an alternate top plate cover construction.
Figure 12:
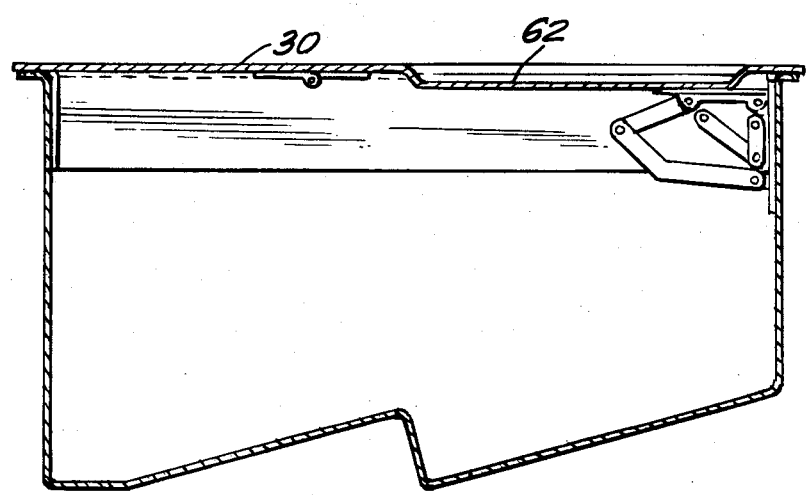
FIG. 12 is a sectional view taken along line 11—11 of FIG. 11a with the top cover plate in the attached position.

FIGS. 11b and 12 illustrate another embodiment of the invention. In these embodiments the top hinged surface 30 is recessed as shown at 62. The purpose of the recess is to receive the carpet so that the raised floor surface is substantially smooth.

Figure 13:
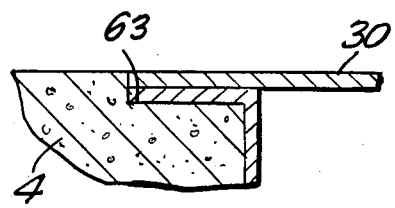
FIG. 13 is a partial secitonal view showing an embodiment of the invention.

Another embodiment of the invention is disclosed in FIG. 13 of the drawings. In this embodiment, means is provided so that the top surface of the electrical connector unit, when in use, is flush with the top surface of the raised floor. As embodied, this is accomplished by providing a recess 63 around the periphery of the opening 6 which is sufficiently deep to accommodate the flanges 22, etc. as well as the thickness of the hinged top plate 30. In this way the top surface of the hinged top plate 30 is substantially flush with the upper surface of the raised floor.

What is claimed is:

1. An electrical connector unit adapted for use in combination with a raised floor wherein the raised floor is spaced above the regular floor so that there is a space between the floors for wire and cables to be electrically connected to the electrical connector, there being a plurality of substantially rectangular openings through the raised floor, comprising:
   a. substantially rectangular frame means adapted to fit within one of the openings in said raised floor;
   b. sling shaped means extending downwardly from opposing sides of the frame adapted to receive a variety of electrical connections,
   c. means connected to said frame adapted to rest on the top surface of said raised floor so that the electrical connector is suspended in the space between the regular floor and the raised floor, and
   d. locking means having a first and a second position connected to said frame adapted to engage said raised floor to maintain the electrical connector unit in plane in a first position and to permit removal of the electrical connector in a second position.

2. An electrical connector unit as defined in claim 1 having a hinge means and a top cover plate, said hinged means being connected to said frame and said top cover plate so that said top plate has a first position wherein the interior of the electrical connector unit is closed and a second position wherein the interior of the electrical connector unit is open.

3. An electrical connector unit as defined in claim 1 wherein said locking means connected to the frame is adapted to engage the undersurface of the raised floor.

4. An electrical connector unit as defined in claim 3 wherein said locking means consists of pivot means attached to said frame, a flange means connected to said pivot means so that the flange means has a first inward position and a second outward position wherein said flange engages the undersurface of the raised floor.

5. An electrical connector unit particularly adapted for use with a raised floor positioned above a regular floor, forming a space therebetween, comprising, in combination:
   a. a plurality of substantially rectangular openings extending through the raised floor;
   b. a substantially rectangular frame for the electrical connector unit;
   c. sling means extending downwardly from opposing sides of said frame adapted to accommodate different electrical connections;
   d. flange means extending outwardly from each side of said frame means adapted to rest upon the upper surface of said raised floor;
   e. locking means connected to said frame means adapted to engage the undersurface of said raised floor whereby said electrical connector unit is removably suspended in the space between said raised floor and the main floor;
   f. a first hinge means attached to one side of said frame;
   g. a top plate attached to said first hinge means and adapted to be moved to a first open position whereby desired wiring can be accomplished and a second closed position whereby the top plate serves as a floor.

6. An electrical connector unit as defined in claim 5 wherein said locking means comprises a pivot extending along opposing sides of said frame, flange means including a raised floor engaging position attached to said pivot means, said flange means being movable to a first inward out-of-the-way position and a second locking position wherein said raised floor engaging position engages the undersurface of said raised floor.

7. An electrical connector unit as defined in claim 5 wherein said locking means comprises a flexible vertical member extending from opposing sides of said frame, an abutment at the free end of said vertical member, said abutment adapted to engage the underside of said raised floor.

8. An electrical connector unit as defined in claim 5 wherein said top plate includes hinge means, fingers means attached to said hinge means, said finger means being movable about said hinge means to provide access to the interior of said electrical connector unit.

9. An electrical connector unit as defined in claim 5 wherein said top plate has a recess for receiving carpeting.

10. An electrical connector unit as defined in claim 5 wherein the upper surface of said raised floor has a recess around the periphery of the said rectangular recess for receiving said flange means so that that top surface of the electrical connector unit will be flush with the top surface of said raised floor.

11. An electrical connector unit particularly adapted for use with a raised floor positioned above a regular floor, forming a space therebetween, comprising, in combination:
   a. a plurality of substantially rectangular openings extending through the raised floor;
   b. a substantially rectangular frame for the electrical connector unit;
   c. sling means extending downwardly from opposing sides of said frame adapted to accommodate different electrical connections;
   d. flange means extending outwardly from each side of said frame means adapted to rest upon the upper surface of said raised floor;
   e. locking means connected to said frame means adapted to engage said raised floor whereby said electrical connector unit is removably suspended in the space between said raised floor and the main floor.

* * * * *